United States Patent Office 2,971,011
Patented Feb. 7, 1961

2,971,011

PROCESS OF PREPARING TRIMELLITIC ANHYDRIDE

Hsiang P. Liao, Park Forest, and Philip H. Towle, Chicago, Ill., assignors to Standard Oil Company, Chicago, Ill., a corporation of Indiana No Drawing. Filed Feb. 27, 1958, Ser. No. 717,825

9 Claims. (Cl. 260—346.3)

This invention relates to trimellitic acid anhydride and more particularly is concerned with an improved process for the preparation of high purity trimellitic anhydride from trimellitic acid. The invention has particular applicability when the trimellitic acid has been produced by the oxidation of a 1,2,4-aliphatic-substituted benzene with molecular oxygen in the liquid phase and in the presence of a heavy metal catalyst.

Trimellitic acid, the 1,2,4 benzene tricarboxylic acid, is useful as an intermediate in the production of quality plasticizers and polyester resins. For these application, in which trimellitic acid is esterified with a monohydric or a polyhydric alcohol, the evolution of water as an esterification byproduct together with the attendant difficulty of eliminating water from esterification reaction mixtures favors the desirability of employing trimellitic acid as the anhydride rather than as the acid. Resins and plasticizers may further require a trimellitic anhydride which is relatively free from color bodies and also free from the heavy metals employed as catalysts for the air oxidation of aliphatic-substituted benzenes to produce trimellitic acid. A TEG (Tri-Ethylene Glycol esterification) color of below 500 is often specified for trimellitic anhydride used in white or transparent resins, and a metal content of less than about 50 p.p.m. (parts per million) is desirable to achieve good color and oxidation stability. While the more commonly employed maleic and phthalic acid anhydrides are readily prepared by thermal dehydration of the corresponding acids, and the anhydrides are easily purified by atmospheric pressure sublimation, trimellitic anhydride cannot be processed in this manner. Firstly, the acid requires temperatures in excess of 200° C. for thermal dehydration to take place, and even at these temperatures dehydration is not complete. Secondly, trimellitic anhydride is essentially nonvolatile and must be distilled at temperatures above 250° C. under vacuums on the order of 10-60 mm. mercury absolute to prevent color degradation. Also, to increase the ordinarily-slow rate of dehydration, it has previously been proposed to employ chemical dehydrating agents such as acetic anhydride, sulfuric acid, phosphorus pentoxide, or the like to dehydrate the last traces of trimellitic acid before distilling the anhydride. These chemical dehydrating agents are costly to recover and regenerate, and consequently impose an expensive operating burden on existing processes for the purification of trimellitic anhydride. Furthermore, their use in some cases results in the substitution of one impurity for another.

Accordingly, an object of the present invention is to provide an improved process for preparing high purity trimellitic anhydride from trimellitic acid without the need for chemical dehydrating agents and without the use of vacuum distillation. A further object is to obtain a trimellitic anhydride having a TEG color below 500 and a metal content below 50 p.p.m. Other and more particular objects will become apparent as the description of this invention is set forth in detail hereinafter.

Although the literature teaches a decomposition temperature for trimellitic acid of 216° C., it has now been discovered that trimellitic acid may be dehydrated to trimellitic anhydride at a rapid rate at temperatures as low as 170° C. by heating in the presence of a moving inert gas stream to carry away water vapor. The dehydration temperature should not, however, exceed 250° C. in order to avoid color degradation of the anhydride. The moving inert gas stream may either be an inert, i.e. anhydride nonreactive, noncondensible gas such as nitrogen or it may be vapors generated in situ by refluxing an inert water-immiscible relatively volatile liquid such as a hydrocarbon. Dehydration at these conditions, however, is not complete and hence the anhydride must be separated from the mixture of trimellitic anhydride and acid. It has also been discovered that, while trimellitic anhydride is very soluble in aromatic hydrocarbons, neither the acid nor any oxidation catalysts dissolve to any appreciable extent. Thus, partial dehydration in the presence of an inert gas, followed by extraction with an aromatic solvent, is capable of producing high purity trimellitic anhydride without the use of either chemical dehydrating agents or vacuum distillation. If required to provide a trimellitic anhydride product having a specified maximum TEG color, the anhydride-aromatic solution may be treated with activated carbon to remove color bodies before recovering high purity trimellitic anhydride.

Crude trimellitic acid may be prepared by the oxidation of various 1,2,4-aliphatic-substituted benzenes by way of several known routes. Chemical oxidizing agents such as nitric acid, chromic acid, potassium permanganate and the like can oxidize a tri-alkylbenzene such as pseudocumene directly to trimellitic acid. Rather than use chemical oxidizing agents, molecular or gaseous oxygen may be employed to effect a liquid phase oxidation of an aliphatic-substituted benzene in the presence of a heavy metal oxidation catalyst such as cobalt or manganese. In this manner, 1,2,4-triisopropyl benzene is oxidized to trimellitic acid. Another process involving molecular-oxygen oxidation is the heavy-metal-catalyzed liquid phase oxidation of pseudocumene by repeatedly oxidizing one methyl radical to a carboxyl group, esterifying that carboxyl group with a lower alkanol, and oxidizing anther methyl radical on the intermediate to another carboxyl group, followed by hydrolysis of the dialkanol ester of trimellitic acid to trimellitic acid. A more direct preparation is the one step oxidation of a trialkylbenzene such as pseudocumene with molecular oxygen in an inert liquid medium at about 150-250° C. employing a catalyst comprising, in conjoint presence, a heavy metal oxidation catalyst and bromine. Suitable metal catalysts are selected from metals having atomic numbers of 13, 21-32, 39-51, 57-84 all inclusive, and the actinide earths, and may be added either in elemental form or as a soluble compound such as cobalt chloride, iron acetate, ammonium chromate, manganese acetyl acetonate, or the like. Likewise, bromine may be added as elemental bromine, HBr, sodium bromide, nickel bromide, benzyl bromide, etc. Trimellitic acid yields from the air oxidation of pseudocumene in the presence of a heavy metal oxidation catalyst and bromine are in excess of 120 weight percent.

In all of the foregoing oxidation processes, a crude trimellitic acid is obtained from the reaction mixture by physical means such as filtration, extraction, evaporation, or distillation. This crude acid however is contaminated with highly colored yellowish or tan-colored tar-like oxidation byproducts and, where the oxidation is effected in the presence of heavy metal catalysts, contains trimellitate salts of the heavy metals. Both of these contaminants must be removed prior to employment of the trimellitic anhydride in the preparation of polyester resins and plasticizers. As noted previously, while phthalic acid and maleic acid can be purified simply by thermal dehydration followed by atmospheric pressure sublimation of the volatile anhydrides, trimellitic acid is considerably more difficult to dehydrate and the anhydride is essentially nonvolatile.

In heating trimellitic acid to form trimellitic anhydride, it has been reported that decomposition does not take place until a temperature of about 216° C. is reached ("Handbook of Chemistry and Physics," p. 1083, Chemical Rubber Publishing Co., Cleveland, 1947; Beilstein's Handbuch gives values ranging from 216 up to 238° C.), but heating at that temperature for prolonged periods may cause color degradation of the anhydride. However, when according to the practice of the present invention a moving gas stream is provided to carry away the water vapors, partial dehydration is effected at temperatures as low as about 170° C., and at 200°–230° C. more than 90% of the acid may be dehydrated in less than one-half hour. Although the dehydration may be conducted at pressures ranging from as little as one-half atmosphere to as much as five atmospheres or more, a particularly advantageous feature of the present invention is that dehydration may be conducted at substantially atmospheric pressure, with resulting savings in equipment cost since the dehydration vessel need not be constructed to contain pressure or vacuum. To provide the inert gas stream, either an inert noncondensible gas such as nitrogen, carbon dioxide or flue gas is passed through or over the trimellitic acid, or alternatively a gas stream is generated in situ by refluxing an inert, substantially water-immiscible liquid which boils above the boiling point of water and below the dehydration temperature. Hydrocarbons such as the paraffins, naphthenes or aromatics of proper boiling range are excellent inert liquids for this purpose.

If the inert gas is a noncondensible gas, it is passed over or through the trimellitic acid undergoing dehydration to purge or carry away the water vapor. In the dehydration temperature range of 170 to 250° C., it is desirable to maintain a flow of inert gas rate above the trimellitic acid or anhydride, so as to remove the water vapor substantially as rapidly as formed. Carbon dioxide and nitrogen are particularly preferred for this purpose as they are non-flammable and conveniently obtained.

Where an inert water-immiscible liquid reflux is employed to generate the inert gas stream, the vaporized reflux and water vapor are condensed and transferred to a suitable receiver to separate the liquids as two substantially immiscible phases. The inert water-immiscible liquid which is to be refluxed is then returned to the heating zone at a rate effective to provide about the same gas rate as when a gas is employed to remove water vapors.

Since aromatic hydrocarbons are employed as selective solvents for trimellitic anhydride, aromatics are likewise desirably employed if an inert liquid reflux is to be used. However, other water-immiscible organic liquids such as ethers, esters, higher alkanols, higher acids, paraffins, etc. may be used but are less desirable. Alkylbenzenes ranging from toluene through the $C_{10}$ or higher aromatics are thermally stable, are substantially immiscible with water, boil above the boiling point of water, and hence are readily separated as a water-free liquid phase in a distillate condenser.

Where a water-immiscible volatile liquid reflux is employed to generate the inert gas stream, the amount of liquid refluxed to the heating or dehydrating zone is regulated to provide a gas purge which serves the same function as the noncondensible inert gas. It has been found that excellent control of the reflux rate may be maintained by initially adding from 0.5 to about 8% by weight of the water-immiscible reflux liquid to the trimellitic acid prior to heating, and refluxing the entire quantity of non-aqueous distillate as fast as it is condensed. Larger amounts of an initially added reflux may of course be employed but from 2 to 8% by weight of an alkylbenzene on trimellitic acid dehydrates more than 90% of the trimellitic acid within less than one-half hour at 200–230° C., and often is 90% effective within 15 minutes. Larger amounts are not harmful but impose a greater heating burden on the dehydration system while not substantially increasing the dehydration rate.

The dehydration vessel may be conveniently an enclosed reboiler or tank or simple still adapted for uniform indirect heating of the trimellitic acid by such means as gas or oil flame or by circulating a hot silicone or mixture of diphenyl and diphenyl oxide fluid through a heating coil or jacket. Since neither trimellitic acid nor the anhydride has an appreciable vapor pressure at dehydration temperatures, it is unnecessary to provide fractional distillation trays or plates in the vessel. If any anhydride does distill, it may be washed back with the liquid reflux. A distillate condenser and receiver is necessary when a volatile water-immiscible liquid reflux is employed in order to separate and reflux the water-immiscible liquid. Where a noncondensible gaseous stream is employed, the gas may be bubbled upward through the trimellitic acid-anhydride mass by a suitable sparger, or a gas jet may be directed down onto or across the surface of the mass. Distillate condensers are unnecessary where a noncondensible gas is used unless it is desired to condense the water vapors. In this event the collected water is not refluxed back to the dehydration vessel. Dehydration in the presence of either a noncondensible gas or a water-immiscible liquid reflux may be conducted batchwise, intermittently, or continuously, and if performed continuously the trimellitic acid may be charged to the dehydration vessel in the form of a slurry in an inert liquid used for reflux.

After a time sufficient to dehydrate most of the trimellitic acid, which time preferably should not exceed 45 minutes at dehydration temperatures in order to minimize color degradation, heating is discontinued. It has been found that the dehydration rate diminishes drastically toward the end of a dehydration, and consequently it is undesirable to continue heating for the disproportionate time needed to convert all of the acid to the anhydride. Hence the dehydration vessel contents are subjected to extraction with an aromatic solvent for the purpose of separating the soluble anhydride from the unconverted insoluble acid. Since pure trimellitic anhydride melts at 163° C., the contents of the dehydration vessel are in the form of a molten liquid comprising trimellitic anhydride and unconverted trimellitic acid which is contaminated with color bodies and heavy metal oxidation catalyst, and it is preferred to extract this molten liquid with the aromatic solvent.

Aromatic hydrocarbons employed as selective solvents for trimellitic anhydride may be either benzene or may be the same volatile normally liquid alkylbenzenes as may be used to provide a water-immiscible reflux for dehydration. Suitable alkylbenzenes are one or more of the mononuclear aromatic hydrocarbons which are liquid at room temperature and which have boiling points ranging from toluene (110° C.) to preferably not substantially higher than about 230° C. The xylenes and pseudocumene are favored by reason of their ready availability and their comparatively low boiling points. Pseudocumene has the further advantage that, after subsequent recovery of trimellitic anhydride from the anhydride-aromatic solution, the pseudocumene with any incompletely oxidized alkylbenzenes may be conducted to the oxidation step for oxidation of the pseudocumene and the incompletely oxidized alkylbenzenes to trimellitic acid.

The high preferential solubility of trimellitic anhydride in aromatics provides an extremely attractive method for extracting trimellitic anhydride from its admixture with unconverted trimellitic acid. At the 136-145° C. boiling temperature of the xylenes, trimellitic anhydride dissolves to the extent of about 11.6 grams per 100 grams of xylene, yet the solubility of trimellitic acid under the same conditions is less than 0.3 gram, or approximately 3% that of the anhydride. In other aromatic solvents trimellitic anhydride and acid are soluble to within about plus or minus 30% of their respective solubilities in xylene. Trimellitic anhydride's solubility in aromatics is greater than its solubility in many other common organic solvents, and at 25° C. is six times that in paraffins of an equivalent boiling range. Thus with aromatics, the quantity of solvent is reduced by a factor of 5/6 of the amount necessary were paraffins employed as selective solvents, with proportional savings in equipment sizes.

The extraction temperature is preferably above about 100° C. in order to minimize the amount of solvent required. If the temperature exceeds the boiling point of the particular aromatic solvent then pressure-containing equipment is required. Since the solubility of trimellitic anhydride increases so rapidly above about 100° C., it is often advantageous to provide pressurized dissolving equipment in order to secure the advantages of minimum solvent requirements. For example, if xylene is employed at its normal boiling point of 136–145° C. approximately 10 parts by weight of xylene is required to dissolve each part of trimellitic anhydride, yet this quantity is halved at 160° C. and only about 2 parts of xylene per part of trimellitic anhydride is needed at about 190° C.

Table I below reports the solubility of trimellitic acid and trimellitic anhydride in xylenes. The xylenes boil between 136 and 145° C. The table permits a direct computation of the minimum amount of xylene or other aromatic necessary to dissolve selectively all of the trimellitic anhydride from the mixture of trimellitic acid and anhydride in the dehydration vessel. Only the theoretical amount of alkylbenzene solvent at the extraction temperature need be used so as to minimize the amount of trimellitic acid concurrently dissolved, although a 10 to 30% excess of solvent may be employed with advantage to assure more rapid extraction. Larger amounts may of course be used but this is not necessary or desirable as lower temperatures must be employed if the trimellitic anhydride is to be recovered by crystallization, or more heat must be applied if recovered by distillation.

TABLE I

*Solubility of trimellitic acid and anhydride in xylene*

| Temp., ° C. | Acid, grams per 100 grams xylene | Anhydride, grams per 100 grams xylene |
| --- | --- | --- |
| 0 |  | 0.20 |
| 20 |  | 0.36 |
| 40 | 0.01 | 0.62 |
| 60 |  | 1.5 |
| 80 |  | 2.00 |
| 100 |  | 3.60 |
| 120 |  | 6.4 |
| 140 |  | 11.6 |
| 160 | 0.3 | 20 |
| 180 |  | 37 |
| 200 |  | 65 |

If the trimellitic acid is produced by molecular-oxygen oxidation in the presence of a heavy metal oxidation catalyst, the catalyst is present in the acid in the form of a trimellitic salt such as a cobalt or manganese trimellitate. Fortuitously, heavy metal trimellitates are almost completely insoluble in aromatic hydrocarbons and accordingly do not dissolve when the anhydride is extracted. Thus when the solid trimellitic acid is filtered or centrifuged from the anhydride-aromatic solution the heavy metal trimellitate salts remain in the solid phase with the unconverted acid and, if desired, may be recycled to the oxidation step. Ordinarily these recycled solids contain some colored oxidation byproducts but in an amount insufficient to create a contamination problem in the oxidation step. The solids may alternatively be recycled to the heating step for further dehydration to trimellitic anhydride.

Where the crude trimellitic anhydride is initially contaminated with excessive amounts of colored tar-like oxidation byproducts and it is accordingly desired to remove these color bodies, an activated carbon adsorbent is employed to treat or decolorize the solution and thereby effect such removal. This treatment is desirably performed after separating insoluble trimellitic acid and any oxidation catalyst from the solution, although it may be conducted concurrent therewith. In the preferred embodiment, carbon treating takes place after trimellitic acid and catalyst are filtered off. Suitable activated carbons are available and may be used either in granular form having a size of for example about 4–8 mesh or may be pulverized to 30–200 mesh and employed as a slurry in the anhydride-aromatic solution. A finely divided carbon decolorizes the solution more rapidly than does a bed of granular carbon.

For proper decolorization, the requisite amount of carbon is varied according to the concentration of color bodies present in the trimellitic anhydride solution and the degree of purity required. Ordinarily from 2 to 15% by weight of activated carbon based on trimellitic anhydride and a contact time of between ½ and 6 hours suffices to give a product having a TEG color well below the 500 usually specified but if the crude anhydride is highly contaminated, larger quantities may be necessary. It has been found that the amount of activated carbon to reach a desired TEG color may be reduced materially if, instead of adding all of the carbon at one time, the carbon is gradually added in several small increments. For example, 6% carbon added in three hourly increments of 2% each gives an improved TEG color product over 10% carbon added all at once, with equal total contact times. The carbon treating temperature may be the temperature at which the anhydride extraction is conducted or may be higher or lower as desired.

The activated carbon adsorbent is removed from the anhydride-alkylbenzene solution by filtration or centrifugation, leaving the solution with only the slight yellow color characteristic of the solvent. The solution is then composed almost entirely of trimellitic anhydride in aromatic, with only minute amounts of metals and color bodies and perhaps a trace of intermediate oxidation products such as alkyl substituted phthalic acids. The latter are generally quite soluble in aromatics, even more so than trimellitic anhydride, and consequently remain in the liquid phase after cooling and crystallization of the anhydride.

Recovery of trimellitic anhydride from its solution is preferably accomplished by crystallization. This may be either by cooling the solution to a temperature below the saturation temperature of trimellitic anhydride or by partially evaporating the solvent, or by simultaneous employment of both procedures. If, according to the preferred embodiment, cooling alone is employed, the amount of trimellitic anhydride recovered at any given crystallization temperature may be computed with reference to Table I. The anhydride initially crystallizes in the form of very small crystals which may be "grown" to crystals of larger size by gradually cooling the solution over a period of several hours with slow agitation. To minimize the growth of crystals on vessel walls it is preferred to conduct the crystallization in a scraped-wall tank or tubular crystallizer.

As previously noted, trimellitic anhydride crystals may also be recovered by partial evaporation of the solvent. The principle is the same; by evaporation, the concentration of anhydride in the aromatic is increased above the solubility limits and the excess anhydride crystallizes out.

Evaporation may be conducted by boiling at about atmospheric pressure or under vacuum or by flashing the solution into a low pressure zone. All or only part of the solvent may be removed in this manner.

Crystallization by cooling and/or by evaporating the solvent may be conducted in one or more operations. For example, a major portion of the anhydride may be recovered by cooling the solution with the mother liquor either recycled to the extraction step, or evaporated or distilled to obtain a second crystal crop. Separation of trimellitic anhydride crystals from the aromatic solvent is by filters, centrifuges, hydrocyclones or gravity settling tanks, with centrifuges offering the advantage of continuous operation, no solvent loss, and the obtention of an anhydride containing less than about 10% by weight of alkylbenzene. Occluded aromatic solvent may be removed from the trimellitic anhydride product by heating the crystals under evaporating conditions or by air or vacuum drying.

The TEG color determination employed to characterize the purity of trimellitic acids or anhydrides is performed as follows:

Four grams of the acid or the anhydride is added to 27.5 ml. of triethylene glycol and the mixture is heated for 60 minutes at 260° C. (500° F.) in a clean glass flask while maintaining a continuous nitrogen purge over the mixture. At the end of this time the mixture is cooled, again under nitrogen, and placed in a Fisher electrophotometer. Its color is compared with APHA color standards. The TEG color is reported in units of numbers of the APHA scale. It has been found that TEG color is directly related to the color of a finished resin or plasticizer. This test is an adaptation of conventional test procedures and gives reproducible results.

To further illustrate various embodiments of the process of the present invention, several examples are presented hereinafter, it being understood that they are illustrative only. The expression "parts" refers to parts by weight.

EXAMPLE I

Crude trimellitic acid is obtained by the liquid phase oxidation of pseudocumene using air as the oxidizing agent and cobalt-manganese-bromine as the catalyst.

This crude trimellitic acid is first treated by dissolving it in water, treating the aqueous solution with activated carbon, and recrystallizing the acid. It has an acid number of 799; the theoretical trimellitic acid number is 801. Thirty parts of the purified trimellitic acid and 1.3 parts of o-xylene are placed in an enclosed round-bottom glass flask which is provided with a water-cooled reflux condenser and an o-xylene filled reflux trap adapted to collect the water of hydration and return the water-immiscible xylene condensate. The flask is partially immersed in a silicone oil heating bath, and the flask contents gradually heated. At a trimellitic acid temperature of 186° C. the first water is condensed and is collected in the trap. The flask contents are heated from 200° C. to 225° C. over a period of about one-half hour; at 213° C. the entire flask contents liquify to a clear yellowish liquid.

At the end of the half hour heating period, 26.4 parts of xylene is added to the flask in order to rapidly cool the mixture. An additional 24.6 parts of xylene is added and the flask contents heated to 136° C. so as to dissolve the trimellitic anhydride. The anhydride-xylene extract is filtered through filter paper at about 136° C. and the solids washed with 220 parts of boiling xylene. The solids, which are unconverted trimellitic acid, weigh 1.4 parts and constitute 4.7% of the original trimellitic acid.

The anhydride-xylene extract and the wash xylene are combined and concentrated by evaporation to about 220 parts. Upon cooling the concentrated solution to 10° C., 25.9 parts of trimellitic anhydride crystallize out and is recovered by filtration. This anhydride is vacuum dried to yield 24.9 parts of a pure white trimellitic anhydride product having an acid number of 874.2. Since the theoretical acid number for the anhydride is 875, 90.8 mol percent of the product is recovered in a purity of greater than 99%.

EXAMPLE II

Thirty parts of crude trimellitic acid (acid number 793; theoretical 801) and 2.6 parts of xylene are placed in the apparatus employed in Example I and gradually heated. At 185° C. the first water is condensed. The flask temperature is increased, and in fifteen minutes of heating up to a maximum temperature of 223° C. vigorous water evolution is observed. Then 375 parts of xylene is added, the mixture is heated to 133° C. and filtered. The filter cake is washed with 220 parts of boiling xylene and dried; it weighs 4.2 parts and has an acid number of 793, equal to the crude trimellitic acid charged. Thus only 14% of the trimellitic acid fails to dehydrate.

The filtrate and xylene wash are combined and concentrated by distillation to a weight of approximately 175 parts, cooled to 10° C., filtered, and dried. 22.7 parts of trimellitic anhydride crystals are recovered in this manner, for a yield of 82.8 mol percent.

EXAMPLE III

One hundred parts of a crude yellow trimellitic acid having a TEG color of about 2000, an acid number of 799, and containing 53,500 p.p.m. of manganese and cobalt is placed in a round bottom enclosed glass heating flask provided with an inlet tube for directing a stream of nitrogen gas over the surface of the acid and thereby sweeping away the water vapor. The nitrogen and water-vapor mixture are cooled in a water-cooled condenser, and the condensate is discarded as it collects. The flask is immersed in a heating bath, and at a temperature of 155° C. the first drops of water are condensed. The flask is rapidly heated to about 225° C. and held at a temperature within a range of 222–230° C. for 15 minutes. At 229° C. the acid-anhydride mixture is entirely molten. 705 parts of boiling xylene is added to the flask and the resulting slurry filtered through filter paper. The filter cake is washed with 530 parts of boiling xylene, dried, and weighed. It weighs 6.4 parts, representing 6.4 percent of crude acid which failed to dehydrate.

The anhydride-xylene filtrate and the xylene wash are slurried with 1.89 parts of activated carbon (Atlas Powder Co., "Darco G-60") and stirred for an hour at about 130–135° C. The carbon is filtered off and a second carbon portion of 1.89 parts is added, stirred for an hour, and filtered. A third portion of 1.8 parts of carbon is added to the filtrate, stirred for an hour, and filtered.

The anhydride-xylene filtrate is cooled to about 25° C. and the trimellitic anhydride crystals which form are filtered off. After drying, the trimellitic anhydride product as an acid number of 872.5 (theoretical is 875), a TEG color of 295 in comparison with the 200 TEG color of the original crude acid, and contains less than 0.2 p.p.m. manganese and no cobalt, in contrast to the 53,500 p.p.m. manganese and cobalt in the crude acid. The total concentration of all metallic impurities in the product is only 30.6 p.p.m.

EXAMPLE IV

The conditions of Example III are duplicated except that $CO_2$ is substituted for the nitrogen gas. Similar yields of high-purity trimellitic anhydride are recovered.

From the discussion and examples above, it is evident that trimellitic anhydride can be purified by the present process without the need for chemical dehydrating agents or the use of vacuum distillation. By simply heating trimellitic acid in the presence of a moving inert gas stream at a temperature between 170–250° C., most of the acid dehydrates, and the anhydride can be almost quantitatively entracted from the acid-anhydride mixture with an aromatic solvent. Any contaminating heavy metal oxidation catalyst remains with the insoluble acid, while color bodies which dissolve in the aromatic solvent may be removed with activated carbon.

Having described the invention, what is claimed is:

1. A process for preparing trimellitic anhydride which comprises heating trimellitic acid at a temperature between 170 and 250° C. in the presence of a moving gas stream in the essential absence of chemical dehydrating agents, said gas being nonreactive with trimellitic anhydride at said temperature, whereby the trimellitic acid undergoes thermal dehydration to trimellitic anhydride, selectively extracting trimellitic anhydride from the mixture of trimellitic anhydride and any unconverted trimellitic acid with a normally liquid aromatic hydrocarbon solvent, and recovering trimellitic anhydride from the extract.

2. Process of claim 1 in which the moving gas stream is a noncondensible gas.

3. Process of claim 2 in which the gas is nitrogen.

4. Process of claim 1 in which the moving gas stream is provided by refluxing a volatile water-immiscible liquid.

5. Process of claim 4 in which the water-immiscible liquid is an alkylbenzene hydrocarbon.

6. Process of claim 5 in which the alkylbenzene is xylene.

7. Process of claim 1 in which the normally liquid aromatic hydrocarbon solvent is xylene.

8. Process of claim 1 in which the normally liquid aromatic hydrocarbon solvent is pseudocumene.

9. Process of claim 1 in which the trimellitic acid is heated to a temperature of between 200 and 230° C. at substantially atmospheric pressure and for a time not greater than about 45 minutes.

References Cited in the file of this patent

UNITED STATES PATENTS

| | | |
|---|---|---|
| 1,685,624 | Andrews | Sept. 25, 1928 |
| 2,411,567 | Fisher | Nov. 26, 1946 |
| 2,789,988 | Brown et al. | Apr. 23, 1957 |

UNITED STATES PATENT OFFICE
CERTIFICATION OF CORRECTION

Patent No. 2,971,011                      February 7, 1961

Hsiang P. Liao et al.

It is hereby certified that error appears in the above numbered patent requiring correction and that the said Letters Patent should read as corrected below.

Column 5, line 46, after "rust" insert -- then --; column 6, line 49, for "oridation" read -- oxidation --; column 7, line 30, for "of" read -- on --; column 8, line 56, for "as" read -- has --; line 57, for "200" read -- 2000 --; same column 8, line 75, for "entracted" read -- extracted --.

Signed and sealed this 20th day of June 1961.

(SEAL)
Attest:

ERNEST W. SWIDER                      DAVID L. LADD
Attesting Officer                      Commissioner of Patents